3,189,658
USE OF COMPLEX FLUORO SALTS TO SEPARATE OLEFINS FROM PARAFFINS

Harold W. Quinn, Sarnia, Ontario, Canada, assignor to The Dow Chemical Company, Midland, Mich., a corporation of Delaware
No Drawing. Filed Jan. 18, 1961, Ser. No. 83,391
Claims priority, application Canada, Apr. 22, 1960, 797,333, Patent 691,251
5 Claims. (Cl. 260—666)

This invention relates to a method for separating olefin-paraffin mixtures, and more particularly, for separating from olefin-paraffin mixtures 1-olefins containing from 2 to 18 carbon atoms, 2-olefins containing from 4 to 8 carbon atoms, and diolefins containing from 4 to 8 carbon atoms.

It is known in the art that silver salts are employed for separating olefins from olefin-paraffin mixtures. Solid anhydrous silver nitrate, silver acetate, silver phosphate, silver perchlorate and certain silver halides have been reported in the literature as being operable agents for effecting the separation of olefins from said mixtures. Also, concentrated aqueous solutions of silver fluoborate and silver fluosilicate were disclosed in U.S. Patent 2,913,505 by Van Raay et al., as agents for separating olefins from olefin-paraffin mixtures.

However, it has now been found that much more efficient separations of olefins from olefin-paraffin mixtures than those disclosed in the art are obtained by contacting the olefin-paraffin mixture in the fluid state with any solid, preferably powdered, anhydrous complex silver salt containing in the anion at least four fluorine atoms, allowing sufficient time for equilibrium to be attained, separating the paraffin from the olefin-silver complex thus formed, decomposing the complex, and recovering the olefin therefrom.

It is to be understood that by the term "in the fluid state" it is meant that the olefin-paraffin mixture may be either gaseous or liquid.

It is also to be understood that the "paraffin hydrocarbon" may be present either as as single compound or as a mixture of two or more individual compounds.

Specific complex silver salts known to be operable in the present invention are silver fluoborate, silver hexafluorophosphate, silver hexafluoroarsenate, silver hexafluoroniobate, silver hexafluoroantimonate, and silver hexafluorotantalate.

The term "olefin" as employed herein is meant to include aliphatic olefins and cycloolefins each containing up to 3 double bonds.

The improved method of the present invention is carried out at a temperature of not more than 100° C.; the efficiency of the separation in any given system, however, is improved with a decrease in temperature. Consequently, the preferred operating temperature is 25° C. or below. There is shown in Table I the effect of decreasing temperature on completeness of separation of 1-heptene from n-heptane in which the original concentration of 1-heptene was 9.11 percent by weight. The silver fluoborate-olefin mole ratio was 1.4 to 1, based on the original olefin concentration.

Table I

| Temperature of Separation, °C. | Concentration of 1-heptene in the heptane after Separation (Wt. percent) |
|---|---|
| 75 | 3.15 |
| 50 | 1.83 |
| 25 | 0.97 |
| 0 | 0.43 |

The mole ratio of silver salt to olefin required to obtain maximum separation of the olefin from its paraffin solution is at least 0.5 to 1 for all monoolefins containing 3 or more carbon atoms and at least 1 to 1 for ethylene, diolefins, and triolefins; although higher mole ratios may be used, no marked improvement in separation is realized by employing proportionately greater amounts of the silver salt.

The method of the present invention is operable over a wide range with respect to the initial concentration of the olefin in the paraffin solution. There are shown in Table II the extremely efficient separations obtained when silver fluoborate was employed as a complexing agent for the separation of 1-heptene from n-heptane at 25° C. and employing a silver fluoborate-olefin mole ratio of 1.4 to 1.

Table II

| Initial Concentration of 1-Heptene (Wt. percent) | Final Concentration, 1-Heptene (Wt. percent) |
|---|---|
| 1.00 | 0.68 |
| 9.11 | 0.97 |
| 50.0 | 0.88 |

Although efficient separations of olefins from their paraffin solutions are obtained by employing silver fluoborate, as hereinbefore disclosed, even more efficient separations have been obtained by employing other solid silver salts, such as for example, silver hexafluorophosphate, and silver hexafluoroantimonate. The experiments shown in Table III and illustrating this unexpected performance of these other silver salts were performed by adding a weighed quantity of a paraffin solution of an olefin to a weighed quantity of the solid anhydrous silver salt and shaking the mixture for about five minutes. The system was then allowed to sit undisturbed for 15 minutes to allow separation of the paraffin layer from the silver-olefin complex layer. The straight chain 1-olefins containing from 5 to 12 carbon atoms produced a liquid complex phase in the presence of the paraffin at 25° C., the solubility of this complex in the paraffin increasing with increasing length of the hydrocarbon chain. Upon cooling to 0° C., the complex phase solidified in all cases, permitting more efficient olefin extraction. When paraffin is not present, all of the complexes are solid at 25° C. When a liquid complex phase was produced a sample of the top (paraffin) layer was removed and centrifuged for ten minutes to insure complete separation of the silver-olefin complex from the paraffin. The supernatant liquid was then washed with water to remove any suspended or dissolved silver compound and dried over anhydrous calcium chloride. In the case of liquid olefins, the dried paraffin was analyzed for olefin content by comparison of its infrared spectrum with that of the original solution. The gaseous olefin concentrations were measured by vapor phase chromatography. Unless otherwise indicated, the temperature was maintained at 25° C. throughout the course of the experiments, and a silver salt-olefin mole ratio of 1.4 to 1 was employed in every instance.

Table III

| Olefin | Initial Concentration (Wt. Percent) | Paraffin Employed | Final Olefin Concentration (Wt. Percent) | | | |
|---|---|---|---|---|---|---|
| | | | $AgBF_4$ | | $AgPF_6$ | $AgSbF_6$ |
| | | | 25° C. | 0° C. | | |
| Ethylene | 0.08 | n-Pentane | 0.013 | | | |
| Propylene | 0.44 | do | 0.156 | | | |
| Do | 1.15 | do | | | | 0.019 |
| Butene-1 | 6.13 | do | 0.439 | | | |
| Do | 5.22 | do | | | | 0.041 |
| Isobutylene | 9.70 | do | 1.43 | | | 0.564 |
| Pentene-1 | 9.07 | n-Heptane | 0.68 | | | |
| 2-Methylbutene-1 | 9.12 | do | 0.53 | | | |
| Heptene-1 | 9.11 | do | 0.97 | 0.43 | 0.10 | (¹) |
| Octene-1 | 9.16 | do | 2.83 | 1.44 | | |
| Decene-1 | 9.09 | do | 9.05 | 4.36 | | 0.15 |
| Dodecene-1 | 9.34 | do | 9.30 | 0.72 | | |
| Tetradecene-1 | 8.98 | do | 5.56 | | 3.58 | 1.20 |
| Hexadecene-1 | 8.88 | do | 1.91 | | | |
| Octadecene-1 | 9.10 | do | 0.75 | | | 0.44 |
| Pentene-2 | 9.05 | do | 2.05 | | | (¹) |
| 2-Methylbutene-2 | 8.92 | do | 5.84 | | | 5.34 |
| Cyclohexene | 9.34 | do | 2.79 | | | 2.88 |
| 2-Methylbutadiene-1,3 | 9.26 | do | 7.74 | | | 4.83 |

Separation of a normally gaseous olefin from an olefin-paraffin gaseous mixture has also been effected by continuously passing the mixture through a bed of anhydrous silver fluoborate for a time sufficient for achievement of equilibrium, the point at which the partial pressure of olefin in the mixture is equivalent to the vapor pressure of the silver salt-olefin complex. In this manner, separations have been made of propylene from n-butane and of isobutylene from propane, the concentration of olefin in the paraffin after extraction corresponding to that predicted from a knowledge of the silver fluoborate:olefin complex vapor pressure. Table IV reports the vapor pressures at 25° C. of the most stable complexes formed between silver fluoborate and the 1-olefins from $C_2$ to $C_4$. The substantially pure olefin can be recovered from the solid complex by merely lowering the olefin pressure below the equilibrium vapor pressure or by raising the temperature. Provided the temperature is not above approximately 100° C., no significant decomposition of the silver salt will occur and it can be employed repeatedly.

Table IV

| Olefin | Complex | Vapor Pressure at 25° C. (mm.) |
|---|---|---|
| Ethylene | $AgBF_4 \cdot C_2H_4$ | 12.76 |
| Propylene | $AgBF_4 \cdot 2C_3H_6$ | 15.82 |
| 1-Butene | $AgBF_4 \cdot 2C_4H_8$ | 12.38 |
| Isobutylene | $AgBF_4 \cdot 2C_4H_8$ | 8.85 |

It is to be understood that the olefin-paraffin mixtures, from which the olefin is extracted by the method of the present invention, may contain various components which are non-reactive with olefins or with the silver-olefin complexes. Examples of non-reactive components which may be present are carbon dioxide, oxygen, hydrogen, nitrogen, carbon monoxide, and noble gases. If acetylene is present in the feed stream, however, it should be removed before the olefin-paraffin mixture is treated by the method of the present invention. The stream should also be essentially free of water for repeatedly efficient separation.

I claim:

1. In a process of separating olefins from mixtures of paraffin hydrocarbons and olefins, wherein said mixture is contacted in the fluid state with a silver salt to effect formation of a silver olefin complex and said complex is separated from the non-complexed hydrocarbons and then substantially decomposed, thus forming the free olefin, the improvement which comprises contacting the mixture of hydrocarbons with solid, essentially anhydrous silver hexafluorophosphate, and separating the thus-formed silver-olefin complex from the non-complexed paraffin hydrocarbons.

2. In a process of separating olefins from mixtures of paraffin hydrocarbons and olefins, whereby said mixture is contacted in the fluid state with a silver salt to effect formation of a silver olefin complex and said complex is separated from the non-complexed hydrocarbons and then substantially decomposed, thus forming the free olefin, the improvement which comprises contacting the mixture of hydrocarbons with solid, essentially anhydrous silver hexafluoroantimonate, and separating the thus-formed silver-olefin complex from the non-complexed paraffin hydrocarbons.

3. In a process of separating olefins from mixtures of paraffin hydrocarbons and olefins, wherein said mixture is contacted in the fluid state with a silver salt to effect formation of a silver olefin complex and said complex is separated from the non-complexed hydrocarbons and then substantially decomposed, thus forming the free olefin, the improvement which comprises contacting the mixture of hydrocarbons with solid, essentially anhydrous silver hexafluoroarsenate, and separating the thus-formed silver-olefin complex from the non-complexed paraffin hydrocarbons.

4. In a process of separating olefins from mixtures of paraffin hydrocarbons and olefins, wherein said mixture is contacted in the fluid state with a silver salt to effect formation of a silver olefin complex and said complex is separated from the non-complexed hydrocarbons and then substantially decomposed, thus forming the free olefin, the improvement which comprises contacting the mixture of hydrocarbons with solid, essentially anhydrous silver hexafluoroniobate, and separating the thus-formed silver-olefin complex from the non-complexed paraffin hydrocarbons.

5. In a process of separating olefins from mixtures of paraffin hydrocarbons and olefins, wherein said mixture is contacted in the fluid state with a silver salt to effect formation of a silver olefin complex and said complex is separated from the non-complexed hydrocarbons and then substantially decomposed, thus forming the free olefin, the improvement which comprises contacting the mixture of hydrocarbons with solid, essentially anhydrous silver hexafluorotantalate, and separating the thus-formed silver-olefin complex from the non-complexed paraffin hydrocarbons.

References Cited by the Examiner

UNITED STATES PATENTS

| | | | |
|---|---|---|---|
| 2,391,404 | 12/45 | Friedman et al. | 260—677 |
| 2,395,956 | 3/46 | Soday | 260—681.5 |
| 2,395,958 | 3/46 | Soday | 260—681.5 |
| 2,913,505 | 11/59 | Van Raay et al. | 260—677 |

ALPHONSO D. SULLIVAN, *Primary Examiner.*

MILTON STERMAN, PAUL M. COUGHLAN,
*Examiners.*